US007165576B2

(12) United States Patent
Carmack et al.

(10) Patent No.: US 7,165,576 B2
(45) Date of Patent: Jan. 23, 2007

(54) BREAKAWAY HOSE COUPLING WITH MANUAL ROTATIONAL SEPARATION

(75) Inventors: Cameron D. Carmack, Dayton, OH (US); David L. Imler, Tipp City, OH (US)

(73) Assignee: Catlow, Inc., Tipp City, OH (US)

( * ) Notice: Subject to any disclaimer, the term of this patent is extended or adjusted under 35 U.S.C. 154(b) by 0 days.

(21) Appl. No.: 11/141,299

(22) Filed: May 31, 2005

(65) Prior Publication Data

US 2005/0263193 A1 Dec. 1, 2005

Related U.S. Application Data

(63) Continuation-in-part of application No. 10/853,876, filed on May 26, 2004, now Pat. No. 6,899,131.

(51) Int. Cl.
*F16L 37/30* (2006.01)
(52) U.S. Cl. .................. 137/614.04; 137/614
(58) Field of Classification Search ........... 137/614.04, 137/614.05, 68.15, 614; 285/2
See application file for complete search history.

(56) References Cited

U.S. PATENT DOCUMENTS

| 4,655,462 A | 4/1987 | Balsells |
| 4,691,941 A | 9/1987 | Rabushka et al. |
| 4,763,683 A | 8/1988 | Carmack |
| 4,905,733 A | 3/1990 | Carrow |
| 5,297,574 A * | 3/1994 | Healy .................. 137/614.04 |
| 5,433,247 A | 7/1995 | Guertin |
| 5,529,085 A * | 6/1996 | Richards et al. ......... 137/68.15 |
| 6,182,695 B1 | 2/2001 | Coates, III et al. |
| 6,283,151 B1 | 9/2001 | Countryman et al. |
| 6,899,131 B1 | 5/2005 | Carmack et al. |

* cited by examiner

*Primary Examiner*—Kevin Lee
(74) *Attorney, Agent, or Firm*—Jacox, Meckstroth & Jenkins

(57) ABSTRACT

A breakaway coupling for a fuel supply hose includes a male tubular valve body interfitting with or female tubular valve body and defining a fuel supply passage, and the valve bodies enclose axially moveable spring biased valve members. The valve bodies are connected by releasable connecting means which provide for moving the valve bodies from a connected position to a disconnected position in response to a substantial axial tension force on the valve bodies. The valve bodies have cooperating peripherally extending and opposing cam surfaces effective to move the valve bodies from the connected position to the disconnected position in response to relative rotation of the valve bodies and cam surfaces. The valve bodies may also define a vapor return passage with an axially movable valve member and disposed either radially outboard or inboard of the fuel supply passage.

20 Claims, 4 Drawing Sheets

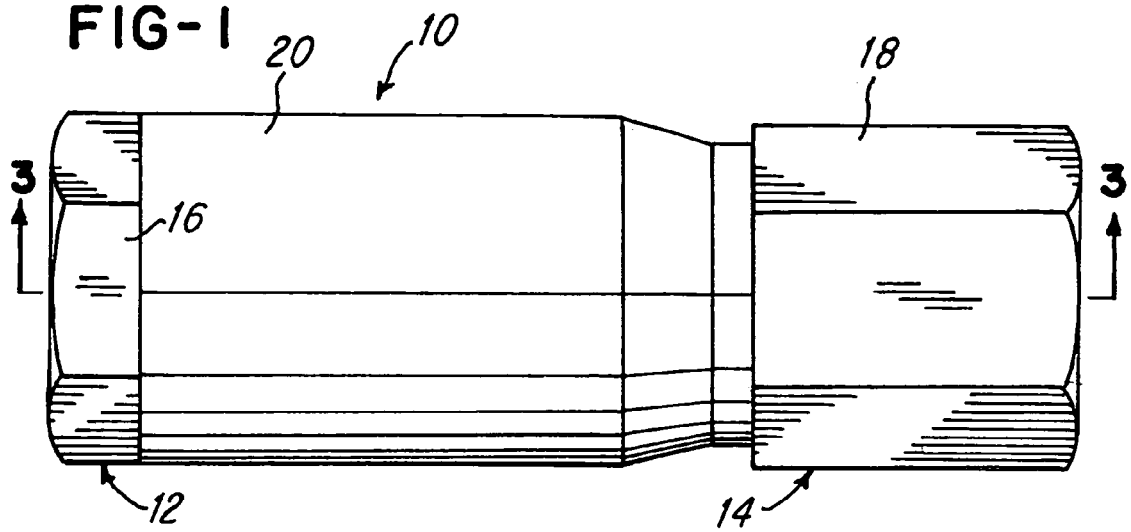
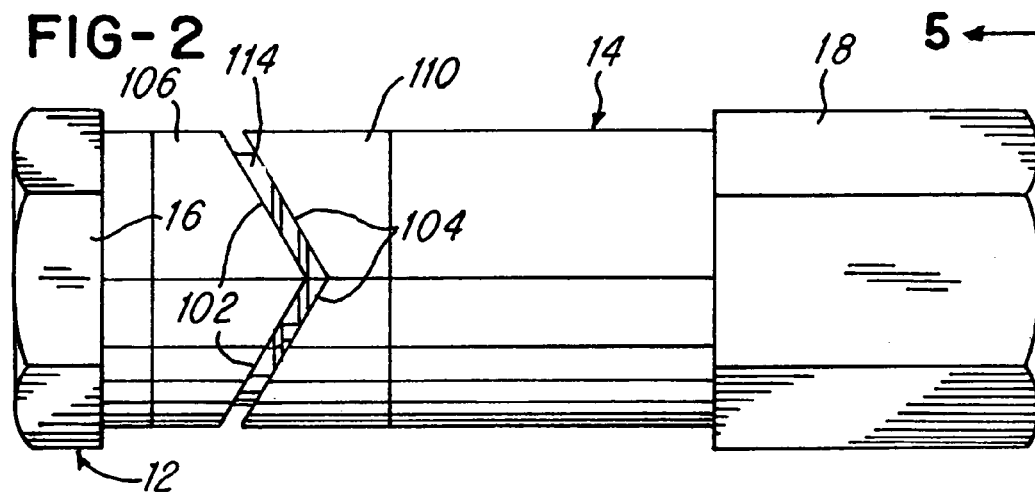
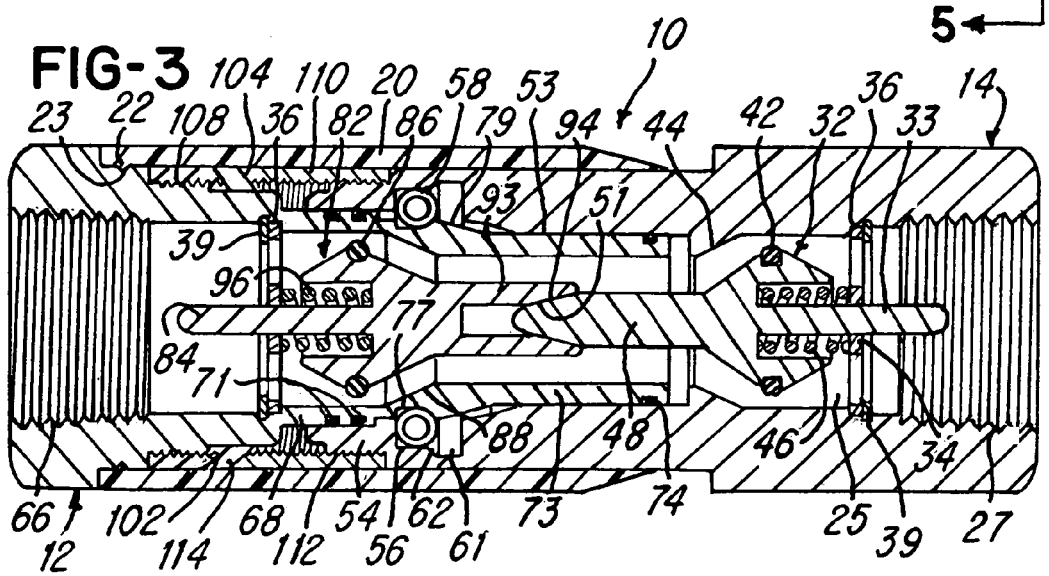

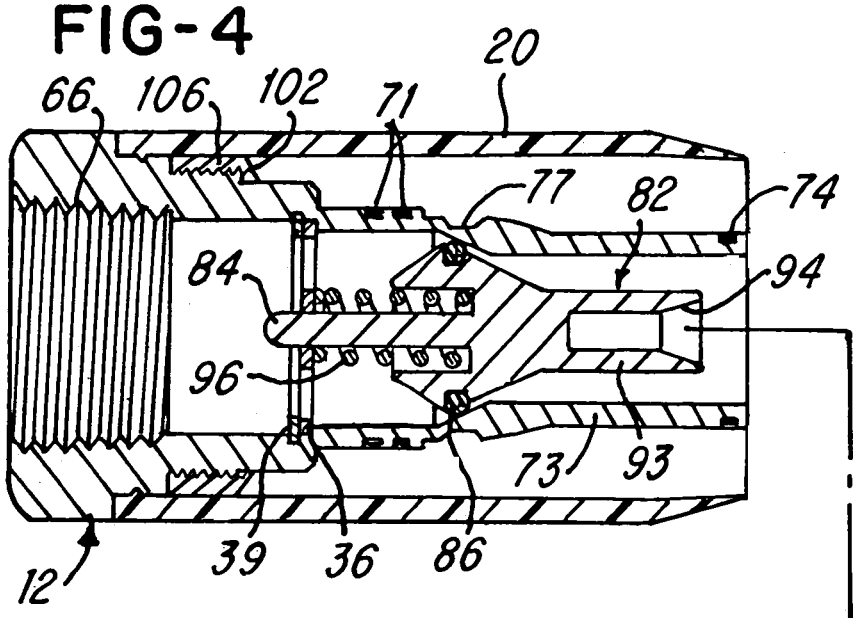
FIG-4
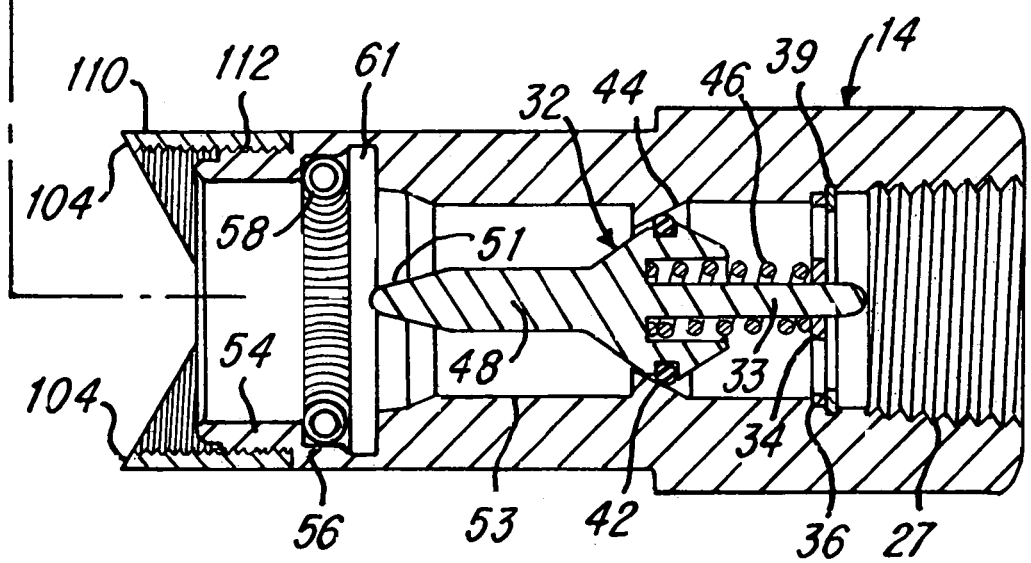
FIG-5
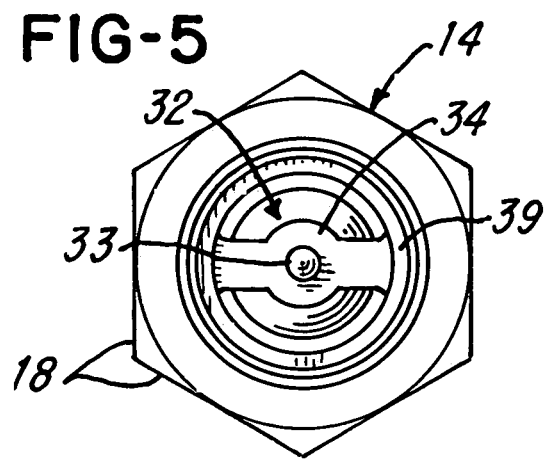

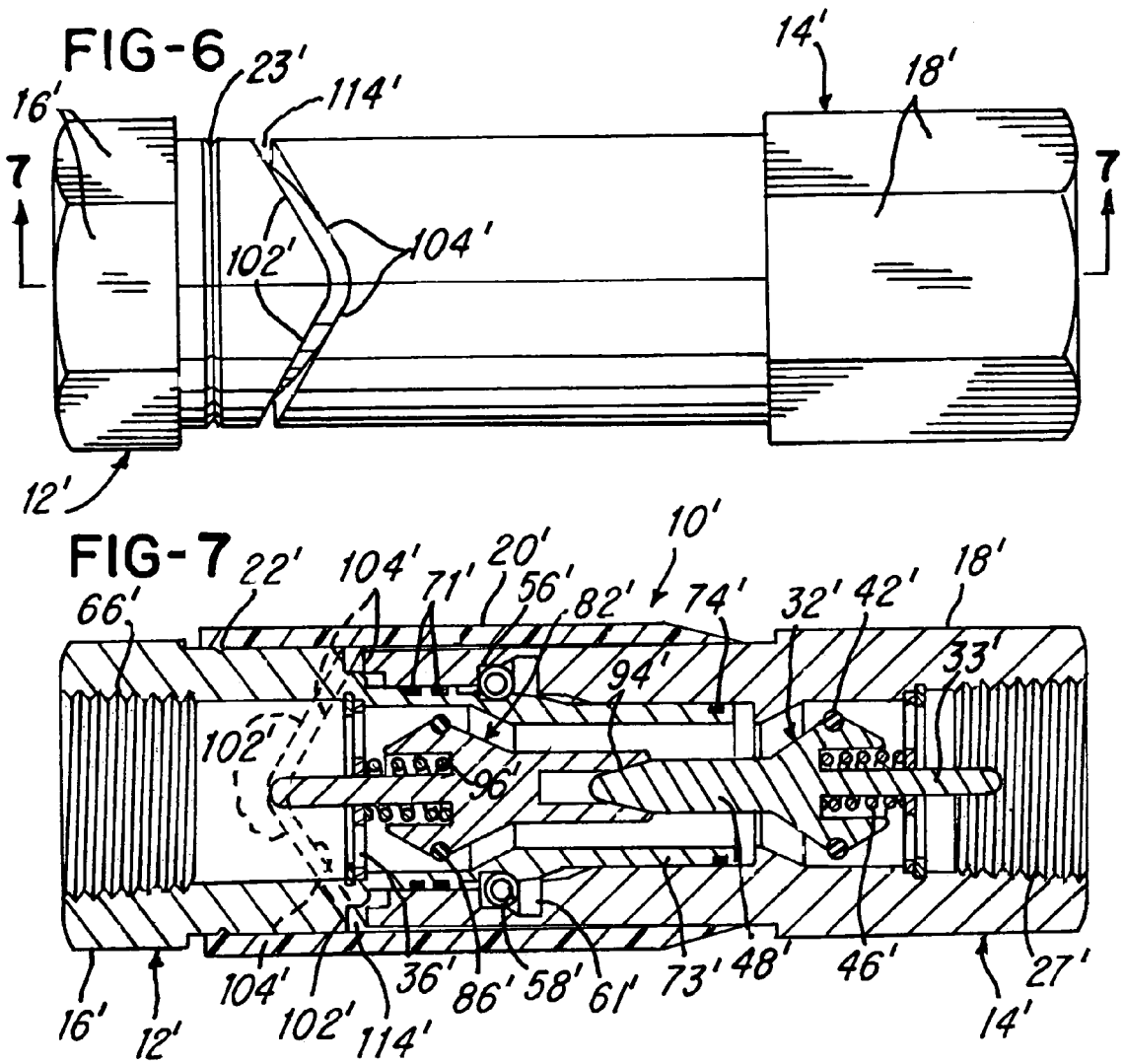

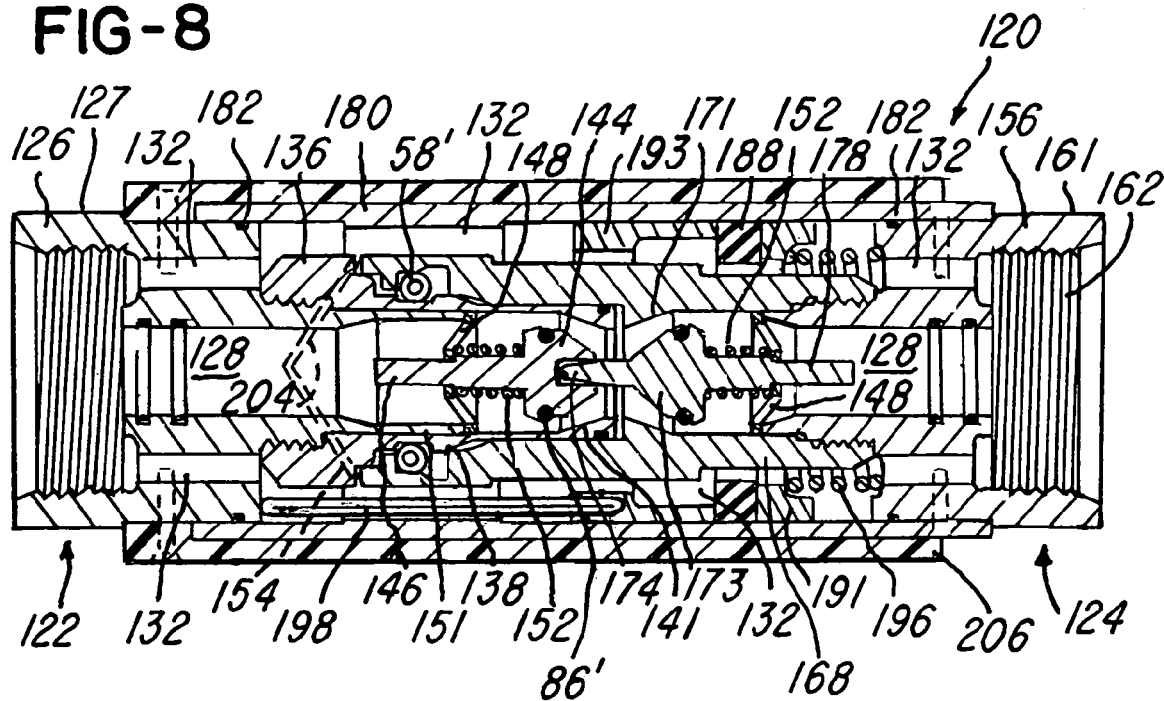
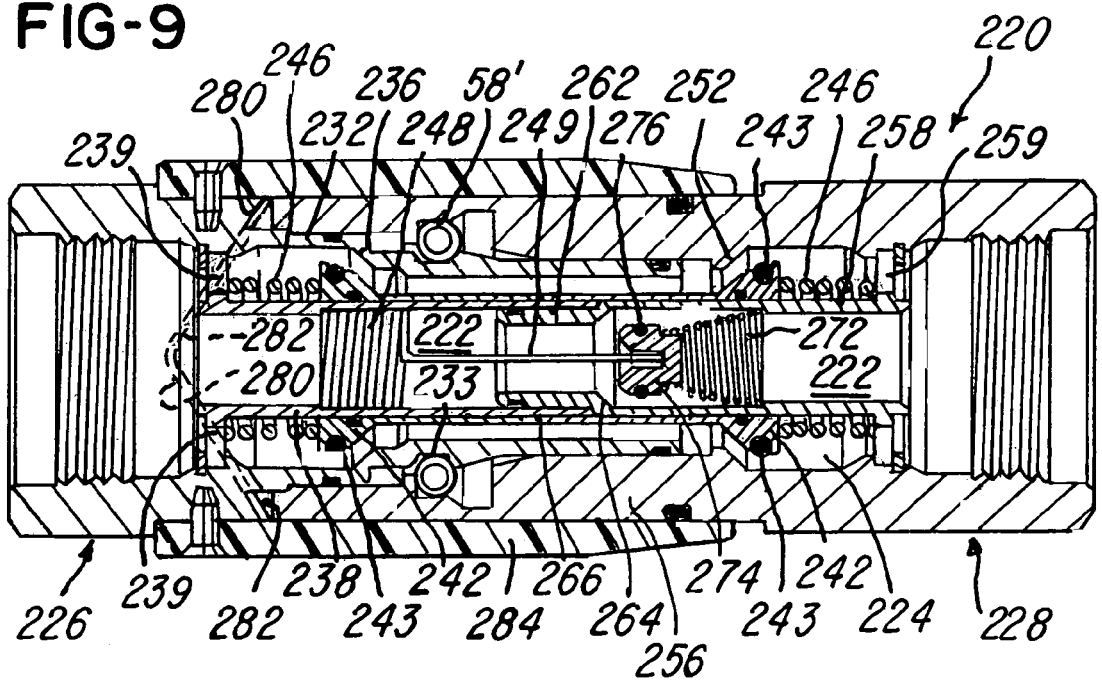

7,165,576 B2

BREAKAWAY HOSE COUPLING WITH MANUAL ROTATIONAL SEPARATION

RELATED APPLICATION

This application is a continuation-in-part of application Ser. No. 10/853,876, filed May 26, 2004, U.S. Pat. No. 6,899,131.

BACKGROUND OF THE INVENTION

The present invention relates to a breakaway hose coupling for a flexible fuel supply hose and of the general type disclosed in U.S. Pat. No. 4,763,683 and No. 5,433,247 which issued to the assignee of the present invention and the disclosure of which is herein incorporated by reference. The breakaway coupling may be for a coaxial hose as disclosed in the patent with a fuel supply passage and a vapor return passage both of which have axially moveable valve members for closing the passages in the event the coupling is separated. The present invention also relates to a breakaway coupling having a single fuel supply passage with axially moveable valve members for closing the fuel supply passage in the male and female coupling bodies in the event of separation of the coupling.

In a breakaway hose coupling having a single fuel supply passage or coaxial fuel supply and vapor return passages, the breakaway hose coupling protects the fuel dispensing equipment from forces which may damage the equipment when separation of the coupling occurs. For example, when a vehicle driver inadvertently forgets to remove the fuel dispensing nozzle from the fuel tank inlet tube and drives away, as disclosed in U.S. Pat. No. 4,691,941, the coupling separates when the hose receives an axial tension force, for example, between 300 to 350 pounds. Upon separation, internal valve members move to their closed positions to prevent the release of fuel from the coupling components and attached hoses.

It has been found desirable to provide for separating the breakaway coupling by the operator of the fueling station or by inspection personnel in order to perform periodic inspection and maintenance on the breakaway coupling to insure continued proper operation of the coupling. One form of manual separation of the breakaway hose coupling is disclosed in U.S. Pat. No. 6,182,695. This patent discloses the use of a cup-like tool having a lever actuated cam and which mounts on the coupling after one of the hoses has been removed by threadably engaging one of the coupling members. The tool applies an axial tension force to the coupling to produce separation of the coupling members. After the coupling is inspected and parts are replaced, if necessary, the tool is used for reassembling the coupling, after which the hose is reattached so that the use of the coupling may be continued.

SUMMARY OF THE INVENTION

The present invention is directed to an improved breakaway coupling for a flexible fuel supply hose and of the type described above. The breakaway coupling of the invention provides for conveniently and quickly separating the coupling without removing a hose from the coupling and with the use of conventional hand tools or wrenches. This separation of the coupling permits a person to perform regular or periodic inspection and maintenance of the breakaway coupling to assure proper and continued operation of the coupling including free movement of the internal valve members. The means for manual separation of the coupling components does not add substantial cost to the manufacture of the coupling nor does it add any significant weight or size to the coupling.

In accordance with embodiments of the invention, a tubular male and female components or valve bodies of a breakaway coupling are provided with axially opposing and peripherally extending cam surfaces. The cam surfaces are effective to exert a substantial axial separating force on the tubular coupling components or valve bodies in response to relative rotation of the valve bodies using conventional tools such as a pair of open end wrenches. The cam surfaces may be formed on integral parts of the valve bodies or may be formed on cylindrical sleeves or collars threadably connected to the valve bodies. Preferably, a resilient cylindrical sleeve is attached to the male valve body and surrounds the cam surfaces and junction of the valve bodies.

Other features and advantages of the invention will be apparent from the following description, the accompanying drawings and the appended claims.

BRIEF DESCRIPTION OF THE DRAWINGS

FIG. 1 is an elevational view of an assembled and connected breakaway coupling constructed in accordance with the invention;

FIG. 2 is an elevational view similar to FIG. 1 but with the protective cylindrical cover removed;

FIG. 3 is an axial section of the assembled and connected coupling components, taken generally on a line 3—3 of FIG. 1;

FIG. 4 is an axial section of the coupling components shown in FIGS. 1–3 and with the components disconnected;

FIG. 5 is an end view of the assembled coupling taken generally on the line 5—5 of FIG. 2;

FIG. 6 is an elevational view similar to FIG. 2 and showing a modification of a coupling constructed in accordance with the invention;

FIG. 7 is an axial section similar to FIG. 3 and taken generally on the line 7—7 of FIG. 6;

FIG. 8 is an axial section similar to FIG. 7 and showing an assembled co-axial balanced-type breakaway coupling constructed in accordance with another embodiment of the invention; and FIG. 9 is a section similar to FIG. 8 and showing an assembled co-axial inverted-type breakaway coupling constructed in accordance with another embodiment of the invention.

DESCRIPTION OF THE PREFERRED EMBODIMENTS

FIG. 1 illustrates a breakaway hose coupling 10 constructed in accordance with the invention and which includes a tubular male valve fitting or body 12 and a tubular female valve fitting or body 14 which are formed of a metal such as aluminum and have corresponding hexagonal outer end surfaces 16 and 18, respectively. As shown in FIGS. 1 and 3, the valve bodies 12 and 14 are shown in their coupled or connected position and are partially surrounded by a resilient and cylindrical sleeve or cover 20 which has an internal circumferential bead 22 which snap-fits into a mating external groove 23 within the valve body 16.

Referring to FIG. 3, the female valve body 14 defines an internal fuel supply passage 25 and has an end portion with internal threads 27 for receiving a fitting on the end of a short fuel supply hose (not shown) extending from a fuel pump or dispenser. A valve element or member 32 is supported for axial movement within the center of the passage 25 by a valve stem 33 slidably supported by a center cross portion 34 of a washer 36 (FIG. 5) secured within the valve body 14 by a retaining ring 39. The valve member 32 carries a resilient sealing ring 42 which is normally urged toward a tapered or frusto-conical surface or valve seat 44 by a compression spring 46. The valve member 32 has an axially projecting center pin 48 which has a tapered or conical end surface 51. The valve body 14 defines a cylindrical bore 53 and a cylindrical end portion 54 having external threads and defines an annular or cylindrical counterbore or cavity 56. The cavity 56 confines an annular latch spring 58, for example, in the form of a canted coil spring as disclosed in U.S. Pat. No. 4,655,462. The valve body 14 also defines a slightly larger diameter counterbore or cavity 61 is connected to the counterbore 56 by a tapered or frusto-conical surface 62.

The male valve body 12 has internal threads 66 for receiving a fitting on the end of a flexible fuel supply hose (not shown) which extends to a fuel dispensing nozzle (not shown). The valve body 12 includes a cylindrical intermediate portion 68 which seats within the end portion 54 of the valve body 14 and carries a pair of external resilient sealing rings 71 to form a fluid-tight seal with the end portion 54 of the valve body 14. The valve body 12 has a cylindrical inner end portion 73 which slides into the bore 53 and carries a resilient external sealing ring 74 to form a second fluid-tight seal between the valve bodies 12 and 14. An annular external seat 77 is formed on the valve body 12 and normally retains the latch spring 58. A tapered or frusto-conical surface 79 extends from the seat 77 to the cylindrical outer surface of the body end portion 73.

The valve body 12 also supports a valve element or member 82 which includes a guide stem 84 supported for sliding movement within the center hole of another circular washer 36 in the same manner as the guide stem 34 of the valve member 32 is supported for sliding movement. The washer 36 is retained by a spring retaining washer 39, and the valve member 82 carries a resilient sealing ring 86 which is adapted to seat on a tapered or frusto-conical surface 88 formed within the valve body 12. The valve member 82 also has a tubular inner end portion 93 with a tapered or frusto-conical seat 94 which receives the tapered end surface 51 of the valve member 32. A compression spring 96 extends from the center portion of the washer 36 into a counterbore within the valve member 82 and cooperates with the compression spring 46 to center the valve members 32 and 82 in their open positions (FIG. 3) when the valve bodies 12 and 14 are coupled or connected together.

In accordance with the present invention, diametrically opposite cam surfaces 102 (FIGS. 2 and 3) are formed on the male valve body 12, and opposing and mating diametrically opposite cam surfaces 104 are formed on the female valve body 14. In the embodiment shown in FIGS. 2–4, the cam surfaces 102 are formed on the end of a tubular or cylindrical sleeve or collar 106 which is connected to the valve body 12 by mating threads 108 (FIG. 3). The cam surfaces 104 are formed on the end of a tubular or cylindrical sleeve or collar 110 which is rigidly connected to the valve body 14 by mating threads 112. Diametrically opposite V-shaped gaps 114 are defined between the cam surfaces 102 and 104 to provide for assembling the valve bodies 12 and 14.

When the valve bodies 12 and 14 are separated (FIG. 4), the latch spring 58 is rolled or shifted to the right (FIG. 3) until the spring 58 expands outwardly into the large annular cavity 61. The valve body 12 is then inserted into the valve body 14 until the cam surfaces 102 engage the cam surfaces 104. The valve bodies 12 and 14 are then pulled axially apart by the width of the gap 114 so that the latch spring 58 rolls inwardly due to pressure exerted by the annular surface 77 until the latch spring is confined within the annular recess 56, as shown in FIG. 3. In this position, the latch spring 58 secures the valve bodies 12 and 14 together in their normal connected and operating position. As mentioned above, a substantial axial tension force, such as 300 pounds to 350 pounds, is required to separate the valve bodies 12 and 14 back to the disconnected positions shown in FIG. 4.

When it is desired to separate the valve bodies 12 and 14 for inspection and/or replacement of internal parts or components, such as the springs and O-ring seals, a pair of wrenches, such as open end wrenches, are inserted onto the hex surfaces 16 and 18, and torque is applied so that the valve bodies 12 and 14 are rotated relative to each other. This causes the cam surfaces 102 and 104 to exert the necessary substantial axial tension force on the valve bodies so that the valve body 12 collapses the latch spring 58 radially until the valve bodies 12 and 14 are free to separate when the valve members 32 and 82 move to their closed positions, as shown in FIG. 4. As also shown in FIG. 4, when the valve bodies 12 and 14 separate, the protective resilient cover 20 remains with the male valve body 12 to provide protection for the tubular end portion 73 of the valve body 12.

A modification of the breakaway coupling is shown in FIGS. 6 and 7. In this embodiment, a breakaway coupling 10' has the same components as the breakaway coupling 10 described above in connection with FIGS. 1–5, and accordingly, the components are identified with the same reference numbers but with the addition of prime marks. The primary difference in the embodiment disclosed in FIGS. 6 and 7 is that the diametrically opposite cam surfaces 102' and the opposing diametrically opposite cam surfaces 104' are formed as integral parts of the corresponding valve bodies 12' and 14'. Preferably, the valve bodies 12' and 14' are machined from a metal such as aluminum using an automatic machining tool center. Thus, the integral cam surfaces 102' and 104' may be easily formed on the valve bodies by appropriate programming of the machining tool center.

Referring to FIG. 8, a breakaway coupling 120 is of the balanced-type, for example, as disclosed in above mentioned U.S. Pat. No. 4,763,683, and wherein the fuel vapor within a motor vehicle fuel tank is displaced by the incoming fuel and is directed back to the fuel dispenser pump through an outer passage within a co-axial hose. In this embodiment, the coupling 120 includes a male valve member or body 122 which couples with a female valve member or body 124. The valve body 122 includes a fitting 126 which has internal threads for receiving a co-axial hose (not shown), a hexagonal outer surface 127 and a center fuel supply passage 128 surrounded by circumferentially spaced and axially extending vapor return passages 132. The fitting 126 is threaded into a tubular fitting extension 136 which has circumferentially spaced spacing ribs and a tubular portion 138 with a peripherally extending groove receiving the latch spring 58' and also has a tapered annular valve seat 141.

A valve member 144 is similar in construction to the valve member 82' and carries a resilient sealing ring 86' for engaging the valve seat 141. The valve member 144 has a center valve stem 146 which is supported for axial movement by a frusto-conical washer 148 similar to the washer 36 and having openings spaced around a hub portion. The outer peripheral portion of the washer 148 seats on the end of a tubular portion 151 of the fitting 126. A compression spring 152 surrounds the stem 146 and urges the valve member 144 towards a closed portion engaging the seat 141. The fitting extension 136 has peripherally extending cam surfaces 154 with a diametrically opposite V-shaped configuration similar to the cam surfaces 102 described above.

The female valve body 124 includes a tubular fitting 156 which defines a continuation of the center fuel supply passage 128 and has a hexagonal outer surface 161 and internal threads 162 for receiving a fitting (not shown) on the end of a relatively short co-axial fuel supply hose such as disclosed in above mentioned U.S. Pat. No. 4,763,683. The fitting 156 also has vapor return passages 132 and is threadably connected to a tubular valve body 168 which defines a tapered annular valve seat 171 extending to a counterbore which receives the tubular portion 138 of the fitting extension 136. The valve body 168 surrounds a valve member 173 which carries a resilient sealing ring and has a tip portion 174 projecting axially into a bore formed within the valve member 144. The valve member 173 also has a stem portion 178 which is slidably supported by another conical washer 148 engaging and seated on the inner end of the fitting 156. Another compression spring 152 surrounds the valve stem 178 and urges the valve member 173 towards a closed position engaging the valve seat 171. As apparent from FIG. 8, when the valve bodies 122 and 124 are pressed axially together, the valve members 144 and 173 move to their open positions compressing the corresponding springs 152.

A tubular housing 180 has a cylindrical outer surface and one end portion attached to the fitting 156. The opposite end portion of the housing 180 slides onto the fitting 126, and resilient sealing rings 182 form fluid-tight connections between the housing 180 and the fittings 126 and 156. The housing 180 cooperates with the concentrically spaced valve bodies 136 and 168 to define a continuation of the vapor return passages 132 within the fittings 126 and 156. An annular resilient lip seal 188 is confined within the housing 180 between a ring 191 and a ring 193, and the seal 188 and rings 191 and 193 move axially to open positions (FIG. 8) forming a continuation of the vapor return passage 132 when the valve bodies 122 and 124 are assembled or coupled together. When the valve bodies are separated, the annular lip seal 188 and the rings 191 and 193 move to the left within the housing 180 in response to a force exerted by a compression spring 196. When the lip seal 188 engages the outer cylindrical surface of the valve body 168, the vapor return passage 132 is closed simultaneously with the closing of the fuel supply passage 128 by the valve members 144 and 173. A set of three circumferentially spaced and axially extending pins 198 have end portions secured to the ring 193 and extend within the vapor return passage 132. The opposite end portions of the pins 198 project between the spacing ribs on the fitting extension 136 and engage the inner end of the fitting 126. When the valve bodies 122 and 124 are coupled together, the pins 198 shift the rings 191 and 193 and the sealing ring 188 to the open position (FIG. 8) so that the fuel vapor is free to flow through the passage 132 of the coupling 120.

As shown in FIG. 8, the inner end of the valve body member 168 has peripherally extending cam surfaces 204 with a diametrically opposite V-shaped configuration mating with the cam surfaces 154. The cam surfaces 154 and 204 function in the same manner as the cam surfaces 102 and 104 and 102' and 104' described above, that is, to separate the valve bodies 122 and 124 axially in response to relative rotation of the fittings 126 and 156 of the valve bodies, respectively. To protect the valve bodies 122 and 124 and the cam surfaces 154 and 204, a cylindrical cover sleeve 206 of a resilient plastics material, has one end portion secured to the fitting 126 and remains with the valve body 122 when the valve bodies 122 and 124 are separated.

Referring to FIG. 9, a breakaway coupling 220 is of the inverted-type, that is, has a center vapor return passage 222 surrounded by a fuel supply passage 224. The coupling 220 includes a male valve member or body 226 and a female valve member or body 228, and the valve body 226 includes a stepped tubular portion 232 having a peripherally extending groove 233 which receives the latch spring 58'. The tubular portion 232 also has a tapered annular valve seat 236 and supports a concentric inner tube 238 having peripherally spaced positioning ribs 239 engaging the valve body 226 and secured by a retaining ring. The inner tube 238 supports a slidable tubular valve member 242 which carries a resilient sealing ring 243. A compression spring 246 urges the valve member 242 towards a closed position where the sealing ring 243 engages the valve seat 236. The inner tube 238 also supports an internal tubular wire coil 248 having an axially extending end portion or pin 249 within the center of the tube 238.

The valve body 228 defines a tapered annular valve seat 252 and has an inner tubular portion 256 which slidably receives inner tubular portion 232 of the valve body 226. The valve body 228 also supports a center tube 258 having peripherally spaced positioning ribs 259 secured by a retaining ring and having an inner tubular portion 262 defining an annular tapered valve seat 264. The center tube 258 also supports another tubular valve member 242 which carries a resilient sealing ring 243, and another compression spring 246 urges the valve member 242 towards a closed position engaging the valve seat 252. When the valve bodies 226 and 228 are connected or coupled together, the inner opposing ends of the two valve members 242 contact each other at 266.

The center tube 258 also supports an internal conical compression spring 272 which seats on an annular shoulder within the tube 258 and supports a valve member 274. The valve member 274 carries a resilient sealing ring 276 for engaging the valve seat 264 when the valve bodies 226 and 228 are separated. When the valve bodies are coupled together, the center pin 249 of the coil 248 extends into the valve member 274 and shifts it to an open position (FIG. 9) against the bias of the spring 272, thereby opening the vapor passage 222. As also apparent, when the valve bodies 222 and 226 are separated, the valve members 242 shift to their closed positions against the valve seats 236 and 252 in response to the forces exerted by the compression springs 246.

The valve bodies 226 and 228 of the coaxial coupling 220 also has a set of mating and opposing V-shaped cam surfaces 280 and 282, respectively. The cam surfaces function to separate the valve bodies 226 and 228 and overcome the connection by the latch spring 58' in response to relative rotation of the valve bodies 226 and 228 with the use of wrenches attached to outer end surfaces of the valve bodies. The cam surfaces 280 and 282 are protected by a resilient plastic sleeve 284 which receives the inner portion 256 of the valve body 228 and is attached to the valve body 226.

From the drawings and the above description, it is apparent that a breakaway coupling constructed in accordance with the invention provides desirable features and advantages. As a primary advantage, the breakaway coupling of the invention may be conveniently and quickly inspected for regular or periodic maintenance and to insure proper operation of the internal valve members by simply rotating the valve bodies relative to each other with conventional hand tools or wrenches. In addition, the separation of the valve bodies may be performed without disconnecting any flexible hoses from the valve bodies. Also, the resilient outer tubular sleeve or cover protects the valve bodies and cam surfaces and prevents dust and dirt from entering the gap between the cam surfaces. As described above in connection with FIGS. 8 and 9, the opposing cam surfaces may be formed on coaxial breakaway couplings with vapor return passages such as a balanced-type coupling shown in FIG. 8 or an inverted-type coupling shown in FIG. 9. The separation means of the invention also eliminates the need for a specially formed tool as disclosed in above-mentioned U.S. Pat. No. 6,182,695.

While the forms of couplings herein described constitute preferred embodiments of the invention, it is to be understood that the invention is not limited to these precise forms of couplings, and that changes may be made therein without departing from the scope and spirit of the invention as defined in the appended claims.

What is claimed is:

1. A breakaway coupling adapted for use with a co-axial flexible fuel supply hose having a fuel supply passage and a vapor return passage, said coupling comprising a first tubular valve body and a second tubular valve body assembled together with a common center axis, each said valve body defining a fuel supply passage and a vapor return passage, an axially movable valve member within each said valve body and movable between an open position and a closed position relative to said fuel supply passage, a connecting member releasably connecting said valve bodies and providing for movement of said valve bodies from a connected position to a disconnected position in response to a substantial axial tension force on said valve bodies, and said valve bodies supporting axially opposing cooperating surfaces connected to rotate with said valve bodies and effective to move said valve bodies from said connected position to said disconnected position in response to relative rotation between said valve bodies.

2. A coupling as defined in claim 1 wherein said cooperating surfaces comprise peripherally extending opposing cam surfaces on said valve bodies.

3. A coupling as defined in claim 2 wherein at least one of said cam surfaces is formed by an integral part of one of said valve bodies.

4. A coupling as defined in claim 2 wherein at least one of said cooperating surfaces is formed by an annular sleeve supported by one of said valve bodies.

5. A coupling as defined in claim 1 and including an annular protective sleeve surrounding both of said valve bodies in said connected position and covering said cooperating surfaces.

6. A coupling as defined in claim 5 wherein said sleeve comprises a resilient material and remains attached to one of said valve bodies when said valve bodies are moved to said disconnected position.

7. A coupling as defined in claim 1 wherein said connecting member comprises an annular coil spring.

8. A coupling as defined in claim 1 and including an axially movable valve member within said vapor return passage.

9. A breakaway coupling adapted for use with a flexible fuel supply hose having a fuel supply passage and a vapor return passage, said coupling comprising a first tubular valve body and a second tubular valve body assembled together with a common center axis, each said body defining a fuel supply passage and a vapor return passage, an axially movable valve member within each said valve body and movable between an open position and a closed position relative to said fuel supply passage, a connecting member releasably connecting said valve bodies and providing for movement of said valve bodies from a connected position to a disconnected position in response to a substantial axial tension force on said valve bodies, and said valve bodies having peripherally extending and opposing cam surfaces effective to move said valve bodies from said connected position to said disconnected position in response to relative rotation of said valve bodies.

10. A coupling as defined in claim 9 wherein said cam surfaces are integral with said valve bodies.

11. A coupling as defined in claim 9 wherein cam surfaces comprise end surfaces on annular sleeves rigidly connected to said valve bodies.

12. A coupling as defined in claim 9 and including an annular protective sleeve of resilient material and surrounding both of said valve bodies in said connected position and covering said cam surfaces.

13. A coupling as defined in claim 12 wherein said sleeve is attached to one of said valve bodies and remains with said one body when said valve bodies are moved to said disconnected position.

14. A coupling as defined in claim 9 wherein said connecting member comprises an annular coil spring, and an axially movable valve member within said vapor return passage.

15. A coupling as defined in claim 9 wherein said valve bodies have flat outer surfaces adapted to receive wrenches to produce said relative rotation of said valve bodies.

16. A coupling as defined in claim 9 wherein said vapor return passage is disposed radially outwardly of said fuel supply passage.

17. A coupling as defined in claim 9 wherein said fuel supply passage is disposed radially outwardly of said vapor return passage.

18. A breakaway coupling adapted for use with a flexible fuel supply hose having a fuel supply passage and a vapor return passage, said coupling comprising a first tubular valve body and a second tubular valve body assembled together with a common center axis, each said valve body defining a fuel supply passage and a vapor return passage, an axially movable valve member within each said valve body and movable between an open position and a closed position relative to said fuel supply passage, an annular coil spring releasably connecting said valve bodies and providing for movement of said valve bodies from a connected position to a disconnected position in response to a substantial axial tension force on said valve bodies, and said valve bodies having peripherally extending V-shaped cam surfaces in opposing relation and effective to move said valve bodies from said connected position to said disconnected position in response to relative rotation of said valve bodies.

19. A coupling as defined in claim 18 wherein said cam surfaces are integral with said valve bodies.

20. A coupling as defined in claim 18 wherein one of said valve bodies supports an axially movable valve member within said vapor return passage.

* * * * *